(12) United States Patent
Song et al.

(10) Patent No.: US 12,120,162 B2
(45) Date of Patent: Oct. 15, 2024

(54) COMMUNICATION PROTOCOL SWITCHING METHOD, APPARATUS, AND SYSTEM

(71) Applicant: Huawei Technologies Co., Ltd., Shenzhen (CN)

(72) Inventors: Licheng Song, Hangzhou (CN); Xiaolei Liu, Hangzhou (CN); Bihai Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 435 days.

(21) Appl. No.: 17/667,912

(22) Filed: Feb. 9, 2022

(65) Prior Publication Data

US 2022/0239718 A1 Jul. 28, 2022

Related U.S. Application Data

(63) Continuation of application No. PCT/CN2020/106631, filed on Aug. 3, 2020.

(30) Foreign Application Priority Data

Aug. 9, 2019 (CN) .......................... 201910736647.3

(51) Int. Cl.
*H04W 4/00* (2018.01)
*H04L 65/61* (2022.01)
*H04L 69/08* (2022.01)
*H04W 4/80* (2018.01)
*H04W 84/12* (2009.01)

(52) U.S. Cl.
CPC .............. *H04L 65/61* (2022.05); *H04L 69/08* (2013.01); *H04W 4/80* (2018.02); *H04W 84/12* (2013.01)

(58) Field of Classification Search
CPC ........ H04L 65/61; H04L 69/08; H04W 84/12; H04W 4/80
USPC ......................................................... 370/329
See application file for complete search history.

(56) References Cited

U.S. PATENT DOCUMENTS

| | | | |
|---|---|---|---|
| 9,338,605 B2 * | 5/2016 | Guba | .................... H04W 48/04 |
| 9,398,421 B2 * | 7/2016 | Guba | ...................... H04W 4/80 |
| 10,268,530 B2 * | 4/2019 | Breaux | .................. B60K 35/00 |
| 2015/0095510 A1 * | 4/2015 | Bhorkar | .............. H04L 12/2805 |
| | | | 709/231 |
| 2015/0365453 A1 | 12/2015 | Cheng | |
| 2016/0188279 A1 | 6/2016 | Rajamani et al. | |
| 2017/0134462 A1 | 5/2017 | Yu | |

(Continued)

FOREIGN PATENT DOCUMENTS

| CN | 103618941 A | 3/2014 |
|---|---|---|
| CN | 105354002 A | 2/2016 |

(Continued)

*Primary Examiner* — Marceau Milord
(74) *Attorney, Agent, or Firm* — Conley Rose, P.C.

(57) ABSTRACT

A communication protocol switching method includes that a first device communicates with a second device using a first protocol to project a screen of the first device to the second device; and when a first application in the first device is opened or a media file stored in the first device is opened, the first device switches to a second protocol to communicate with the second device and to project a display user interface of the first application or the media file to the second device, where the first application manages or plays at least one media file.

20 Claims, 7 Drawing Sheets

(56) References Cited

U.S. PATENT DOCUMENTS

2018/0152891 A1* 5/2018 Xie .................. H04W 52/0235
2019/0056904 A1* 2/2019 Li .......................... G09G 5/006
2019/0182749 A1* 6/2019 Breaux ................ H04W 4/027

FOREIGN PATENT DOCUMENTS

| CN | 105681881 A | 6/2016 |
| CN | 106454299 A | 2/2017 |
| CN | 106488207 A | 3/2017 |
| CN | 106502604 A | 3/2017 |
| CN | 107608647 A | 1/2018 |
| CN | 107801064 A | 3/2018 |
| CN | 108200215 A | 6/2018 |
| EP | 3104551 A1 | 12/2016 |

* cited by examiner

COMMUNICATION PROTOCOL SWITCHING METHOD, APPARATUS, AND SYSTEM

CROSS-REFERENCE TO RELATED APPLICATIONS

This is a continuation of International Patent Application No. PCT/CN2020/106631 filed on Aug. 3, 2020, which application claims priority to Chinese Patent Application No. 201910736647.3 filed on Aug. 9, 2019. The disclosures of the aforementioned applications are hereby incorporated by reference in their entireties.

TECHNICAL FIELD

The present disclosure relates to the communications field, and in particular, to a communication protocol switching method, apparatus, and system.

BACKGROUND

Two terminals located at a short distance from each other may be connected to and communicate with each other by using a plurality of technologies. For example, the two terminals communicate with each other by using a WI-FI direct technology. In this case, the two terminals do not need to be located in a same wireless local area network (WLAN). A Miracast technology is a common WI-FI direct technology. For another example, the two terminals communicate with each other by using a WLAN technology. In this case, the two terminals need to be located in a same WLAN. A Digital Living Network Alliance (DLNA) technology is a common WLAN technology. In a process of using a terminal, communication is usually performed by using different technologies in different scenarios. Therefore, switching between communications technologies is performed. Further, this may be switching from one group of communication protocols to another group of communication protocols or switching from a communication protocol to another communication protocol. In this process, a user needs to perform an operation on the terminal to trigger sending of a switching instruction. In other words, a switching process is completed by the terminal based on an operation of the user. This results in comparatively low switching efficiency and inconvenience of operation and also affects user experience.

For example, a smart television (TV) is connected to a mobile phone, to project content displayed on a screen of the mobile phone or a media file (such as a high-definition video or picture, or an audio file) stored in the mobile phone to the smart TV for playing. Screen mirroring can be used. To be specific, display content on the screen of the mobile phone is projected to a screen of the smart TV in real time. Alternatively, the media file in the mobile phone may be directly transmitted to the smart TV, and the smart TV directly plays the media file. The Miracast technology is used in screen mirroring, and the DLNA technology is used for playing the media file. The smart TV does not support screen projection performed by using a plurality of protocols at the same time. Therefore, when a screen of another terminal is projected to the smart TV through screen mirroring, if a medial file such as a high-definition picture or video needs to be viewed by using the DLNA technology, the mobile phone needs to be switched to a DLNA technology-based connection to connect to the smart TV, and then the medial file is projected based on the connection. In this process, a user needs to perform operations on the mobile phone, for example, starting a screen projection application and tapping an icon of the smart TV in a list to switch to another connection. In another manner, a user controls the smart TV to make the smart TV send a switching instruction to the mobile phone. The mobile phone transmits, to the smart TV according to the switching instruction, data that is to be projected after the switching. The user performs an operation on a button on the smartphone, a remote control or a set top box of the smart TV, or an application for controlling the smart TV in the mobile phone, to implement the foregoing process. It can be learned that in the conventional technology, switching between connection technologies needs to be completed under user control. This results in low switching efficiency and affects user experience.

SUMMARY

In view of this, this application provides a communication protocol switching method, apparatus, and system, to enable switching of communication protocols, especially communication protocols for screen projection, between two devices that is triggered by an application startup or a projection content change, without requiring user control. This improves switching efficiency and improves user experience.

The following describes the method, an apparatus to which the method applies, and the like by using different aspects. Implementations and beneficial effects of the following aspects can be cross-referenced.

According to a first aspect, this application describes a communication protocol switching method. The method includes that a first device communicates with a second device by using a first protocol, to project a screen of the first device to the second device, when a first application in the first device is opened or a media file stored in the first device is opened, the first device switches to a second protocol to communicate with the second device, to project a display user interface (UI) of the first application or the media file to the second device, where the first application is used to manage or play a media file.

The first protocol and the second protocol each may be a group of protocols or a single protocol. For example, the first protocol is based on a Miracast technology, and the second protocol is based on a DLNA technology.

The first device and the second device each may be a terminal. For example, the first device is a mobile phone, and the second device is a terminal with an operating system and a relatively large screen, such as a smart TV, a smart screen, or an intelligent large screen. In this way, protocol switching between the first device and the second device is triggered based on an application that runs on the first device and that is related to the media file, rather than triggered under user control. This improves switching efficiency and improves user experience.

There may be two triggering modes: active triggering and passive triggering.

In an implementation, that the first device switches to a second protocol to communicate with the second device is triggered by the first application or a second application that is used to open the media file.

In an implementation, that when a first application in the first device is opened or a media file stored in the first device is opened, the first device switches to a second protocol to communicate with the second device includes, when a software development kit (SDK) for screen projection in the first device detects that the first application is opened or that the media file stored in the first device is opened, the first device switches to the second protocol to communicate with the second device.

In an implementation, when the first application in the first device is opened or the media file stored in the first device is opened, the display user interface of the first application or the media file is projected by the first device to the second device in full screen. In other words, the display user interface of the first application or the media file is directly projected to the second device in full screen by using the switched-to protocol, without requiring a user to enter an instruction. Alternatively, the second device performs displaying based on the screen of the first device and then adjusts a display effect. This is more convenient and can achieve a better projection effect more easily.

In an implementation, the first device maintains a device list corresponding to the second protocol. The device list includes an identifier of a device that can communicate with the first device by using the second protocol. That when a first application in the first device is opened or a media file stored in the first device is opened, the first device switches to a second protocol to communicate with the second device includes, when the first application in the first device is opened or the media file stored in the first device is opened, the first device queries the device list corresponding to the second protocol, if a unique device identifier (UDID) of the second device is found, the first device switches to the second protocol to communicate with the second device, if a UDID of the second device is not found, the first device sends instruction information to the second device to instruct the second device to perform protocol switching, and the first device receives the UDID of the second device, where the UDID of the second device is transmitted by using the second protocol.

To be specific, if the second device supports both the first protocol and the second protocol, the first device switches to the second protocol for communication, and the second device can directly coordinate with the first device. If the second device does not support the second protocol, the first device cannot find the second device directly in the list corresponding to the second protocol, and the first device sends the instruction information to the second device, so that the second device makes a corresponding preparation and sends the UDID by using the second protocol. The second device may establish a protocol stack of the second protocol based on a peer-to-peer (P2P) technology, or migrate a protocol stack of the second protocol to a protocol stack of a technology, so that the second device can send the UDID by using the second protocol. In this way, the second device can establish a second protocol-based connection on a basis of a first protocol-based connection. This simplifies a connection establishment process, and is more convenient and time-saving.

In an implementation, the method further includes that the first device identifies the second device by using a near-field communication (NFC) technology. For example, the first device may identify the second device by identifying an NFC tag of the second device, enabling the first device to identify the second device more conveniently. This is easy to use and learn. For example, the user only needs to touch the NFC tag of the second device by using the first device.

In an implementation, the method further includes, after identifying the second device, the first device receives the UDID of the second device. The UDID is transmitted by using the first protocol. This step is performed by the first device and the second device in a device discovery process. The second device registers, in this manner, the UDID of the second device to a device list that is in the first device and that corresponds to the first protocol.

In an implementation, the method further includes, when the first application in the first device is closed or the media file stored in the first device is closed, the first device switches back to the first protocol to communicate with the second device. If the first protocol is used to implement screen mirroring, the second protocol can be used to achieve a better screen projection effect for a media file of a source end, switching back to the first protocol can reduce communication resources required between the source end and a sink end and reduce power consumption of the two terminals. This achieves proper allocation and usage of projected content based on projected content.

According to a second aspect, this application further describes a communication protocol switching method. The method includes that a second device communicates with a first device by using a first protocol, to project a screen of the first device to the second device, the second device receives a first instruction that is transmitted by the first device by using the first protocol, and establishes a protocol stack of a second protocol based on a P2P technology according to the first instruction, where the first instruction is used to instruct the second device to switch to the second protocol, the second device communicates with the first device by using the second protocol, so that a media file or an application user interface of the first device is displayed on the second device.

Therefore, the second device can perform communication protocol switching according to the instruction of the first device, unlike the conventional technology in which whether protocol switching needs to be performed can be determined only by detecting a network environment. In this way, protocol switching is performed in a timelier manner, so that a display effect required by screen projection can be achieved in a timely manner.

It should be understood that the second device coordinates with the first device to implement the methods according to the first aspect and the second aspect. Therefore, for specific implementations and technical effects, reference may be made to the first aspect.

In an implementation, the media file or the application user interface is displayed in full screen on the second device.

In an implementation, after the second device establishes the protocol stack of the second protocol, the method further includes that the second device listens to a broadcast of the first device on a channel corresponding to the second protocol, when detecting the broadcast through listening, the second device sends a UDID of the second device to the first device by using the second protocol.

In an implementation, the method further includes that the second device receives a second instruction that is sent by the first device by using the second protocol, the second device switches, according to the second instruction, back to the first protocol to communicate with the first device.

According to a third aspect, this application describes a communication protocol switching system. The system includes a first device and a second device. The first device is the first device according to any implementation of the first aspect and the second aspect. The second device is the second device according to any implementation of the first aspect and the second aspect.

According to a fourth aspect, this application describes a communication protocol switching apparatus. The apparatus is located in a first device, and the first device runs a first application. The apparatus includes a communications module configured to communicate with a second device by using a first protocol, to project a screen of the first device to the second device, and a protocol switching module configured to, when the first application is opened or a media file stored in the first device is opened, switch the first device to a second protocol to communicate with the second device, to project a display user interface of the first application or the media file to the second device, where the first application is used to manage or play a media file.

The apparatus described in the fourth aspect may perform the method described in the first aspect. For a specific description and technical effects, refer to the description of the first aspect.

According to a fifth aspect, this application describes a communication protocol switching apparatus. The apparatus is located in a second device. The apparatus includes a first communications module and a projection module, where the first communications module is configured to communicate with a first device by using a first protocol, to enable the projection module to project a screen of the first device to the second device, a protocol switching module configured to receive a first instruction that is transmitted by the first device by using the first protocol, and establish a protocol stack of a second protocol based on a P2P technology according to the first instruction, where the first instruction is used to instruct the second device to switch to the second protocol, and a second communications module configured to communicate with the first device by using the second protocol, so that the projection module displays a media file or an application user interface of the first device on the second device.

The apparatus described in the fifth aspect may coordinate with the first device to perform the method described in the first aspect or may perform the method described in the second aspect. For a specific description and technical effects, refer to the description of the first aspect and the second aspect.

According to a sixth aspect, an embodiment of the present disclosure describes a device. The device includes a processing circuit, a communications interface, and a storage medium. The storage medium stores an instruction. The communications interface is configured to perform information sending and receiving with another device. The processing circuit is configured to run the instruction in the storage medium, to implement, in coordination with the communications interface, the method described in the first aspect and the various implementations of the first aspect.

According to a seventh aspect, an embodiment of the present disclosure describes a device. The device includes a processing circuit, a communications interface, and a storage medium. The storage medium stores an instruction. The communications interface is configured to perform information sending and receiving with another device. The processor is configured to run the instruction in the storage medium, to implement, in coordination with the communications interface, the method described in the second aspect and the various implementations of the second aspect.

According to an eighth aspect, a computer program product is provided. The computer program product is configured to store program code that can be used to implement the method according to any one of the various implementations of the first aspect, or is configured to store program code that can be used to implement the method according to any one of the various implementations of the second aspect.

According to a ninth aspect, a computer-readable storage medium is provided, including an instruction. When the instruction is run on a computer, the computer is enabled to perform the method according to any one of the various implementations of the first aspect or the method according to any one of the various implementations of the second aspect.

BRIEF DESCRIPTION OF DRAWINGS

To describe the technical solutions in some of the embodiments of the present disclosure more clearly, the following briefly describes the accompanying drawings for describing the embodiments. The accompanying drawings in the following description show merely some embodiments of the present disclosure, and a person of ordinary skill in the art may derive other drawings from these accompanying drawings without creative efforts.

DESCRIPTION OF EMBODIMENTS

Embodiments of the present disclosure provide a communication protocol switching method, apparatus, and system. The following clearly describes technical solutions in the embodiments of the present disclosure with reference to the accompanying drawings in the embodiments of the present disclosure. All other embodiments obtained by a person of ordinary skill in the art based on the embodiments of the present disclosure without creative efforts shall fall within the protection scope of the present disclosure.

The following explains some terms in this application.

A and/or B represents A and B, or A or B.

A method described in this application may be applied to a scenario in which two or more devices exchange data within a short range. Data exchange within a short range means that communication can be performed by using a wireless signal within the range. For ease of description, in this application, a data sending device, that is, an origin end of data, is referred to as a source end, and a data receiving end or display end is referred to as a sink end. For example, in the scenario illustrated in the Background section, the mobile phone is a source end, and the smart TV is a sink end. The smart TV has a short-range data exchange function. Therefore, the mobile phone can directly communicate with the smart TV. The scenario illustrated in the Background section may alternatively be as follows. A terminal for display (such as a TV) is connected to a terminal for control (such as a set top box or a TV box). The mobile phone projects, by using the set top box or the TV box, screen content or a media file to the terminal for display. In this case, the mobile phone is a source end, and the set top box or the TV box is a sink end. The mobile phone and the smart TV or the TV box may be connected in a P2P manner, or may be connected by using a router or a wireless access point in a home or a neighborhood.

Figure 1:
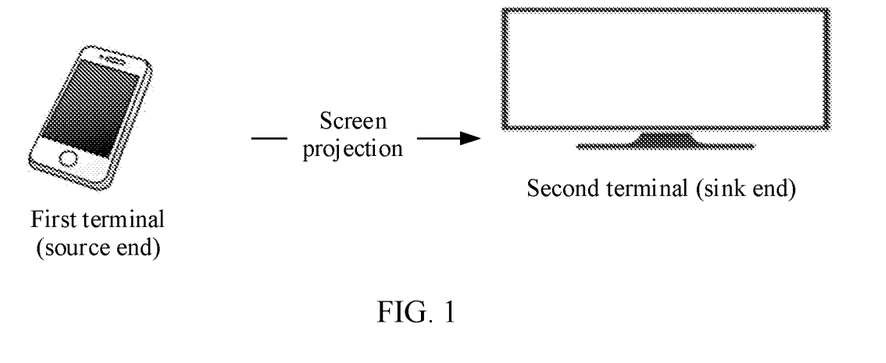
FIG. 1 shows a screen projection scenario according to an embodiment of the present disclosure.

FIG. 1 illustrates projection of a screen of a first terminal to a second terminal. The first terminal may be a mobile phone, and the second terminal may be a terminal with a relatively large screen such as a smart TV or a smart large screen.

It should be noted that the solution provided in the embodiments may be applied to a terminal device, a server device, or the like. A server may include a storage server, a computing server, or the like.

A terminal may also be referred to as a user equipment (UE). The terminal in this application is able to support at least two short-range wireless communications technologies. Common short-range wireless communications technologies include a protocol described in the Institute of Electrical and Electronics Engineers (IEEE) 802.11, wireless personal area network (WPAN), BLUETOOTH, ZIGBEE, and the like.

For example, the terminal may be a mobile phone (or cellular phone) or a computer with a mobile nature. The terminal may alternatively be a portable, pocket-sized, handheld, computer built-in, or vehicle-mounted mobile apparatus, for example, a mobile phone, a tablet computer, a notebook computer, a smart wearable device (such as a smart watch, a smart band, or smart glasses), a smart voice device (such as a smart speaker), a smart TV, a network access device (such as an access point, a set top box, or a TV box), a mobile internet device (MID), a vehicle-mounted device, an augmented reality (AR)/virtual reality (VR) device, a desktop, laptop, or handheld notebook computer, an ultra-mobile personal computer (UMPC), a netbook, a personal digital assistant (PDA), or another device. No limitation is imposed on a specific form of the electronic device in the embodiments of this application.

In this application, communication between two terminals is used as an example for description.

A device may be indicated by using a UDID. The UDID can uniquely indicate the device. In other words, each of a plurality of devices in communication in a network has a unique UDID. A form and a generation manner of a UDID are not limited in this application. For example, a UDID of a device may be factory-set, for example, a number of an IOS device. For another example, a unique identifier is allocated, by using an algorithm, to a terminal connected to a network.

In this application, a manner of communication between an application and a module in an operating system in which the application is located is sending a broadcast. In other words, in this case, broadcasting is a communication mode between processes. In another case, a device may send broadcast information through a channel. The broadcast information is intended to transmit information to another device that is in a propagation range of the broadcast information and that can receive the broadcast information.

In a process of implementing short-range communication by using either a Miracast technology or a DLNA technology, a group of protocols needs to be used. This is because an entire communication process includes a plurality of sub-processes, and each sub-processes uses a currently known protocol. Using the DLNA technology as an example, technologies and protocols included in the DLNA technology are technologies and protocols that are widely applied currently. Further, in the DLNA technology, a device is connected to a wireless network by using a technology of 802.11a/b/g/n and a protocol of Internet Protocol (IP) version 4 (IPv4) or IP version 6 (IPv6), a Hypertext Transfer Protocol (HTTP) Secure (HTTPS) protocol is used for media transmission, and a Universal Plug and Play (UPnP) technology of INTEL is used in device discovery and control and media management. In a protocol switching scenario described in this application, a protocol or technology type is not limited, and a protocol used is not limited to a widely applied standard protocol either. This application is applicable provided that a protocol or technology switching process is involved in a communication process. The switching may be switching from a group of protocols to another group of protocols, for example, the foregoing scenario of switching between the Miracast technology and the DLNA technology. The switching may alternatively be switching from a group of protocols to a protocol or switching from a protocol to a group of protocols. For example, the switching may be switching between a proprietary protocol and a protocol that is used by the Miracast technology. Alternatively, the switching may be switching between a protocol and another protocol. In addition, this application does not limit a used technology or protocol, and a scenario to a short-range wireless communication scenario. For example, a short-range wired protocol may be applicable, and some remote protocols and scenarios may also be applicable. Further, protocol switching is also needed when a mobile phone or a vehicle-mounted device remotely projects content to a TV at home or when a TV communicates with a remote terminal. In this case, the method and system that are described in this application may also be applicable.

Figure 2:
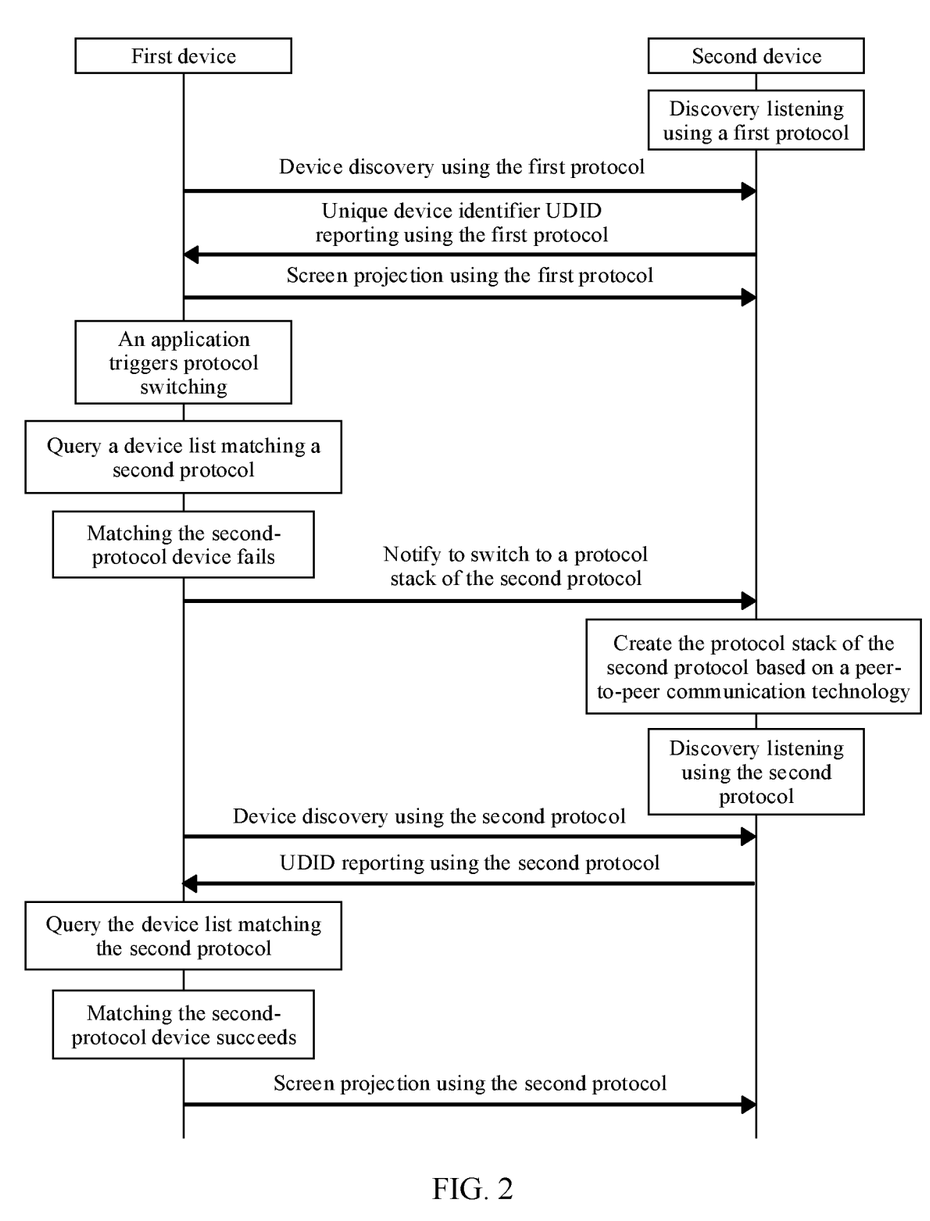
FIG. 2 is a schematic diagram of a communication protocol switching method according to an embodiment of the present disclosure.

The following describes an implementation of a protocol switching method with reference to FIG. 2. A second device may be considered as a sink end, and a first device can be considered as a source end.

The second device performs listening by using a first protocol, to discover a device discovery instruction that is based on the first protocol and that is broadcast by the first device. The second device reports a UDID of the second device to the first device by using the first protocol, and the first device projects a screen to the second device by using the first protocol.

An application in the first device triggers screen projection protocol switching, for example, when the application is opened or when the application is used to open a media file. The first device queries a device list that matches a second protocol and that is maintained in the first device (where a protocol stack of the second protocol already exists in the first device). Matching fails if the UDID of the second device is not found in the list. This indicates that the second device cannot use the second protocol yet.

The first device notifies the second device to switch to the protocol stack of the second protocol. Based on this, the second device creates the protocol stack of the second protocol in the second device by using a P2P technology, and performs listening by using the second protocol, to discover a device discovery instruction that is based on the second protocol and that is broadcast by the first device. The second device reports the UDID of the second device to the first device by using the second protocol. In this way, the UDID of the second device can be included into the device list that is in the first device and that corresponds to the second protocol. The first device queries the device list that matches the second protocol and that is maintained in the first device (where the protocol stack of the second protocol already exists in the first device). Matching succeeds if the UDID of the second device is found in the list. The first device projects the media file in the first device to the second device by using the second protocol.

The first protocol may be a group of protocols based on the Miracast technology, and the second protocol may be a group of protocols based on the DLNA technology.

In this way, through device discovery in the foregoing process, the UDID of the sink end is registered to the source end, so that the source end can project the screen to the sink end by using the first protocol. After a media-related application in the source end is opened, the application triggers the source end to switch to a protocol for screen projection. The source end searches a device list of the switched-to protocol (such as the second protocol) for the UDID of the sink end, and establishes, by using the second protocol, a connection for screen projection, to complete protocol switching. This process does not require a user of the source end or the sink end to control and manipulate the protocol switching process. A mobile phone can automatically implement imperceptible protocol switching based on a current browsing status of a user, without requiring the user to care about a screen projection protocol and a difference between different protocols. For example, a picture/video can be displayed in a high definition effect on a large screen, to improve visual experience of screen projection. In addition, automatic imperceptible switching can also be implemented in a scenario in which the mobile phone and the large screen are not in a same local area network, without requiring the user to instruct or control a device to perform protocol switching (for example, the instructing or controlling may include opening a system application for transmission control and selecting a new connection mode to establish a connection by using a new protocol or technology, or tapping an icon related to screen projection in the application to trigger the application to perform protocol switching). Instead, after detecting a running status of an application, the source end performs protocol switching based on a device discovery status in the source end. In this way, the user can directly enjoy a protocol switching result without a need to control the protocol switching and without a need to care about which protocol needs to be used at a specific time period or understand a performance difference between protocols, and the source end performs screen projection protocol switching based on content or an application currently browsed by the user. Even if the source end and the sink end are not in a same local area network, the source end can still implement screen projection protocol switching without requiring user configuration.

The method described in this application is applicable to the following scenario. A terminal with a relatively small volume (which is referred to as a first terminal for short and may be a mobile phone, a smart wearable device, or the like) interacts with another terminal with an operating system and a relatively large screen (which is referred to as a second terminal for short and may be a smart TV, a smart screen, or the like), to project display content of the mobile phone or a media file stored in the first terminal to the second terminal. A user mirrors content on a screen of the first terminal to the second terminal by using an NFC function of the first terminal and a Miracast protocol family. Further, after opening a component that is of the first terminal and that is used to control the NFC function (for example, tapping an icon indicating the NFC function on the screen of the first terminal), the user moves the first terminal close to an NFC tag of the second terminal or to touch the NFC tag of the second terminal, or the user swipes down on the screen of the first terminal. In this way, the first terminal can discover the second terminal by using an NFC technology, to further perform screen mirroring by using a Miracast technology. In a screen mirroring process, if the user opens a picture in the first terminal through tapping, the picture is displayed in full screen on the second terminal by using DLNA. In other words, screen projection protocol switching is triggered by the user by switching to-be-projected content (for example, opening the picture through tapping).

Figure 3A:
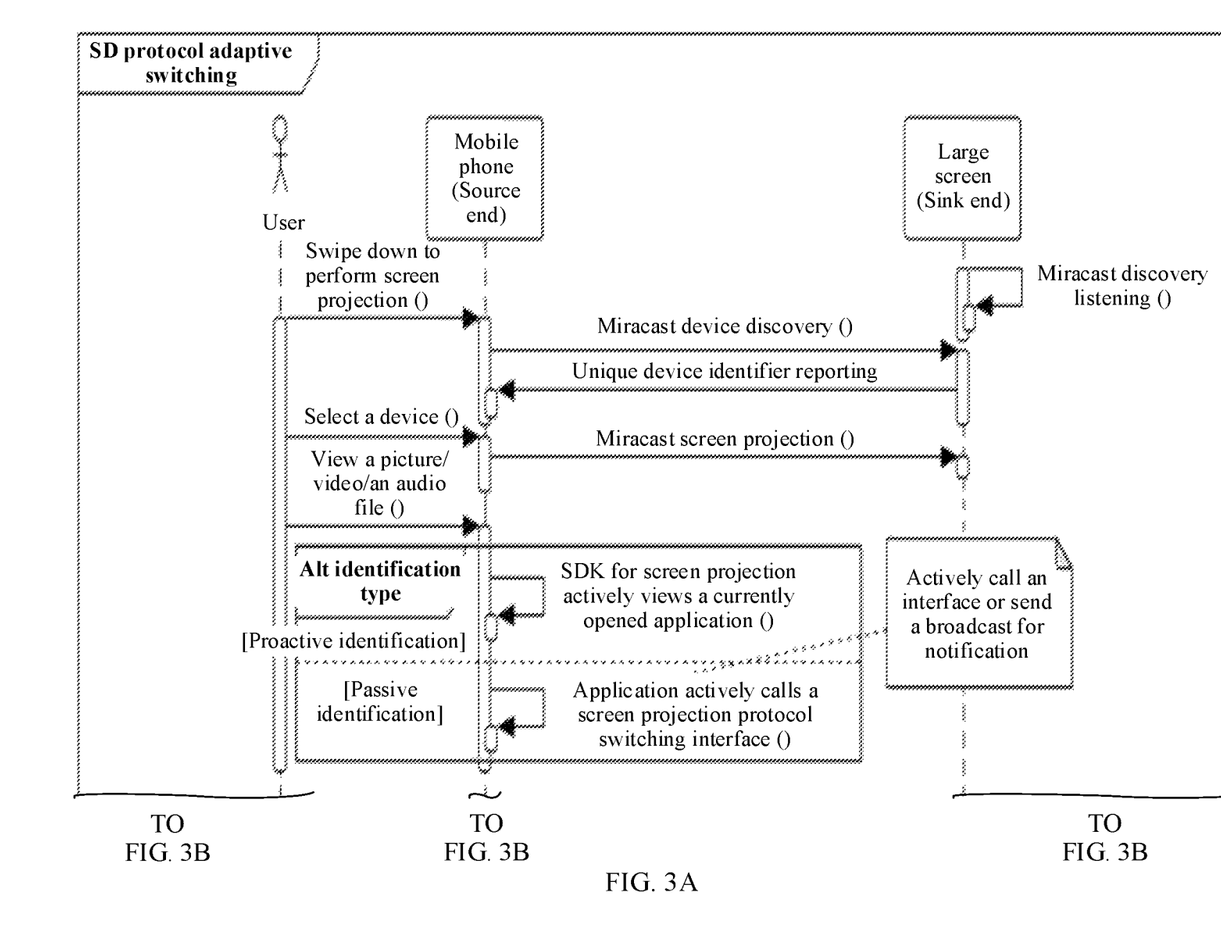
FIG. 3A, FIG. 3B, and FIG. 3C are a schematic diagram of another communication protocol switching method according to an embodiment of the present disclosure.
Figure 3B:
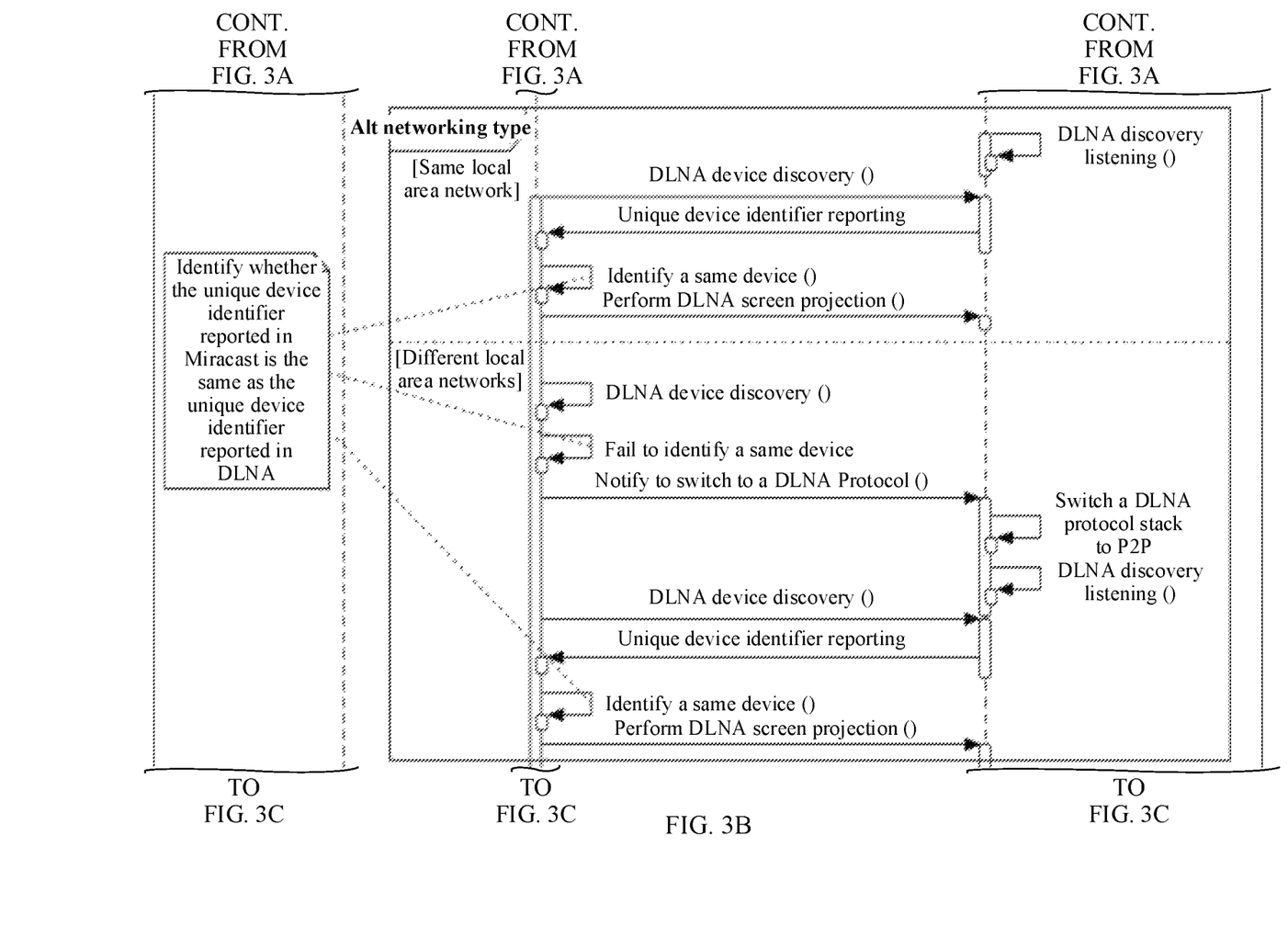
Figure 3C:
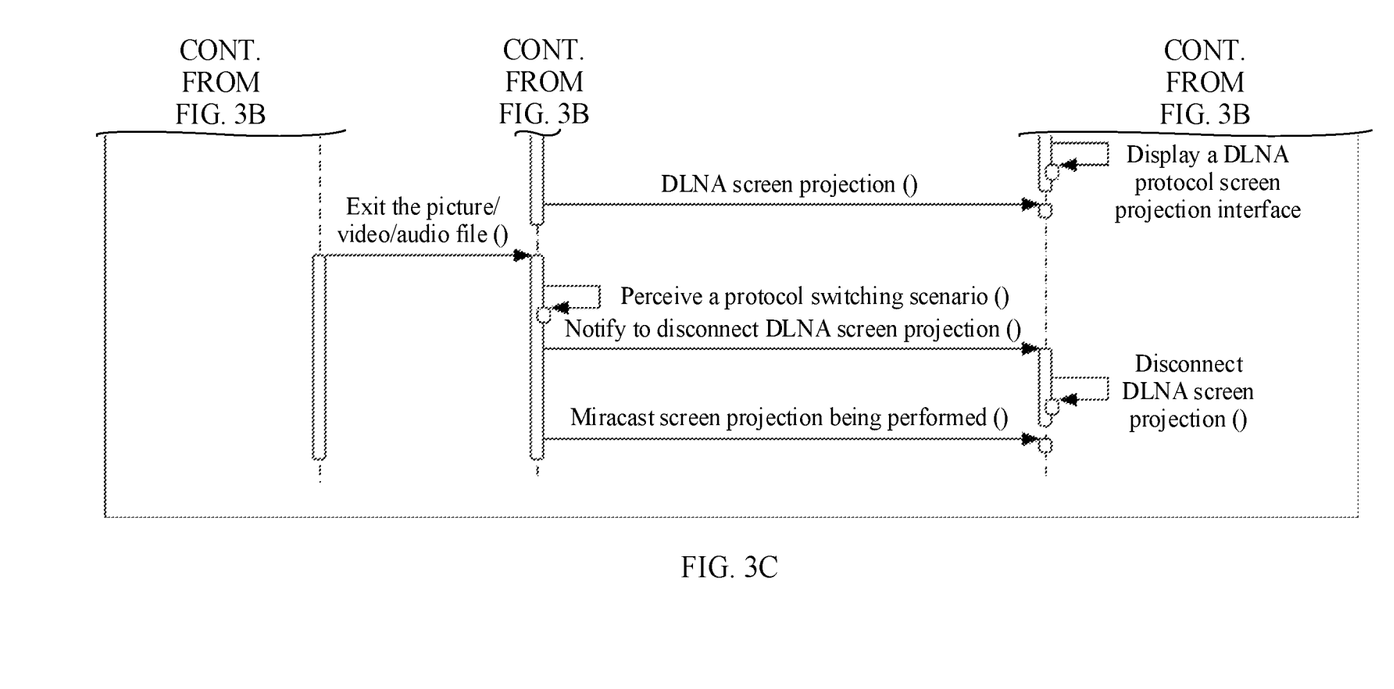

To implement protocol switching while switching the to-be-projected content and implement a protocol switching process free of user control, this application provides a protocol switching method. The following provides descriptions with reference to FIG. 3A to FIG. 3C. In FIG. 3A to FIG. 3C, parentheses after each step represents a corresponding interface called to perform the step.

A user performs an operation on a source end (for example, a mobile phone in FIG. 3A to FIG. 3C) to perform screen projection. For example, the user uses a first gesture (for example, a swipe-down gesture) to perform an operation on a screen of the mobile phone to perform screen projection.

A sink end (for example, a terminal with a large screen, which is referred to as a big screen in FIG. 3A to FIG. 3C) listens on a corresponding channel by using a device discovery protocol in each of two groups of protocols (for example, a protocol corresponding to a Miracast technology and a protocol corresponding to a DLNA technology). When the sink end detects, through listening, broadcast information sent by the source end, the sink end reports a UDID of the sink end to the source end. The UDID is reported through a channel corresponds to a protocol and on which the broadcast information is detected through listening. If the UDID of the sink end is identified on both channels corresponding to the two groups of protocols, the UDID is reported by through both the channels. In FIG. 3A to FIG. 3C, the UDID is reported by the large screen through a channel corresponding to the Miracast technology.

The source end caches the UDID reported by the sink end. Then, the source end can project a screen of the source end to the sink end by using a P2P-technology-based protocol (a first protocol, for example, a group of protocols corresponding to the Miracast technology) in these protocols. In other words, the source end identifies, based on the UDID, that a same device (that is, the sink end) exists in device lists corresponding to different protocols, thereby implementing switching between different protocols on a same device without requiring user operation.

In FIG. 3A to FIG. 3C, represent that a step is optional or is a possible implementation, or in other words, the step has two or more implementations. A plurality of implementations of a step are framed in a solid box and are separated by dotted lines. For example, FIG. 3A to FIG. 3C illustrate two such steps. One step is how the source end identifies a protocol switching condition. Two implementations, namely, proactive identification and passive identification, are illustrated in the figure. The other step is how to implement protocol switching when the source end and the sink end are in different networking types, that is, how to implement protocol switching when the source end and the sink end belong to a same local area network and when the source end and the sink end belong to different local area networks.

When an application of the source end runs, for example, when the user views a media file such as a picture, a video, or an audio file, the application actively calls an application programming interface (API) for screen projection or sends a broadcast to notify a screen projection management center (which is a module in an operating system and may further be a process or a thread) of the source end, to implement protocol switching. This manner may be referred to as "passive identification". Alternatively, a screen projection SDK of the source end monitors or views an application running status of the source end and starts protocol switching when discovering that an application is running, for example, when the user views a media file such as a picture, a video, or an audio file. This manner may be referred to as "active identification". The application may be an application that requires screen projection or an application related to a multimedia file or a text file, for example, a system application of the mobile phone, including but not limited to at least one of a graphics library or a video player, a music player, or even a document viewer, for another example, the first application and the second application mentioned above. In addition, a media file that needs to be played at the sink end is usually stored in the source end. In another scenario, the application may be YOUTUBE, NetEase Cloud Music, or the like.

Further, in a process of switching to a DLNA protocol, the source end queries, in a device discovery list corresponding to another group of protocols (a second protocol, for example, a group of protocols based on the DLNA technology) of the source end, whether the UDID indicating the sink end exists. If the UDID indicating the sink end exists, the source end performs screen projection directly by using the second protocol (it can be considered that the source end and the sink end belong to a same local area network). If the UDID indicating the sink end does not exist (it can be considered that the source and the sink end belong to different local area networks), the source end prepares a protocol stack of the second protocol based on the P2P protocol, and notifies, by using an instruction in the first protocol, the sink end to prepare the protocol stack of the second protocol based on the P2P protocol, so as to project a file of the source end to the sink end by using the second protocol. When the foregoing application in the source end exits, the application calls a screen projection interface or sends a broadcast (which is a type of instruction) to notify the screen projection management center to switch back to the first protocol to continue screen projection. It should be understood that in both implementations of the protocol switching process, the source end performs a device identification sub-process. To be specific, the source end searches, based on the UDID sent by the sink end during communication performed by using the first protocol, the device discovery list corresponding to the second protocol for the sink end. Through this process, the same device can be identified from different protocols based on the UDID.

In this way, in a device discovery process, the sink end sends the UDID to the source end by using a protocol available to the sink end. The available protocol includes at least the first protocol. Therefore, screen projection to the sink end is performed by using the first protocol. If the second protocol of the sink end is also an available protocol in the device discovery process, the source end receives the UDID of the sink end separately by using the first protocol and the second protocol. When the source end performs screen projection protocol switching based on application information, if the source end can identify the same device from different protocols based on the UDID, the source end switches to the second protocol. If the first protocol is a group of protocols based on the Miracast technology, and the second protocol is a group of protocols based on the DLNA technology, it also indicates that the source end and the sink end belong to a same local area network.

In another aspect, if the second protocol of the sink end is an unavailable protocol in the device discovery process, when performing screen projection protocol switching based on application information, the source end cannot find the UDID of the sink end in the device discovery list corresponding to the second protocol, that is, cannot find the same device in another protocol. It indicates that the sink end needs to perform configuration concerning the second protocol. If the first protocol is a group of protocols based on the Miracast technology, and the second protocol is a group of protocols based on the DLNA technology, it also indicates that the source end and the sink end do not belong to a same local area network. The source end may notify, by using an instruction, the sink end to establish the protocol stack of the second protocol based on the P2P technology or switch the protocol stack of the second protocol to a P2P local area network. Then, a device discovery process based on the second protocol is also performed. The process includes that the sink end listens to a broadcast of the source end on a channel corresponding to the second protocol and sends the UDID of the sink end to the source end. In this way, the source end also identifies the UDID of the sink end in the second protocol, thereby performing imperceptible screen projection protocol switching.

In an implementation, after screen projection protocol switching is performed, a projected application user interface or media file is displayed in full screen on the sink end. In this way, an advantage of the switched-to protocol can be fully leveraged, achieving a relatively good screen projection effect without requiring the user to manually adjust display to full screen. This is more convenient.

Through device discovery in the foregoing process, the UDID of the sink end is registered to the source end, so that the source end can project the screen to the sink end by using the first protocol. After a media-related application in the source end is opened, the application triggers the source end to switch to a protocol for screen projection. The source end searches a device list of the switched-to protocol (such as the second protocol) for the UDID of the sink end, and establishes, by using the second protocol, a connection for screen projection, to complete protocol switching. This process does not require a user of the source end or the sink end to control and manipulate the protocol switching process. The mobile phone can automatically implement imperceptible protocol switching based on a current browsing status of the user, without requiring the user to care about a screen projection protocol and a difference between different protocols. For example, a picture/video can be displayed in a high definition effect on the large screen, to improve visual experience of screen projection. In addition, automatic imperceptible switching can also be implemented in a scenario in which the mobile phone and the large screen are not in a same local area network, without requiring the user to instruct or control a device to perform protocol switching (for example, the instructing or controlling may include opening a system application for transmission control and selecting a new connection mode to establish a connection by using a new protocol or technology, or tapping an icon related to screen projection in the application to trigger the application to perform protocol switching). Instead, after detecting a running status of an application, the source end performs protocol switching based on a device discovery status in the source end. In this way, the user can directly enjoy a protocol switching result without a need to control the protocol switching and without a need to care about which protocol needs to be used at a specific time period or understand a performance difference between protocols, and the source end performs screen projection protocol switching based on content or an application currently browsed by the user. Even if the source end and the sink end are not in a same local area network, the source end can still implement screen projection protocol switching without requiring user configuration.

In addition, when perceiving a protocol switching condition or event again, for example, when the user exits the application or exits browsing of the media file, the source end may notify the sink end to disconnect second-protocol-based screen projection, and the source end performs screen projection by using the first protocol again. If the first protocol is used to implement screen mirroring, the second protocol can be used to achieve a better screen projection effect for the media file of the source end, switching back to the first protocol can reduce communication resources required between the source end and the sink end and reduce power consumption of the two terminals. This achieves proper allocation and usage of projected content based on projected content.

The technical solutions of the present disclosure can be applied to various screen projection scenarios. Using a "picture browsing" scenario as an example, when a terminal with a relatively small screen (for example, a mobile phone) projects a screen to another terminal with a relatively large screen (for example, a TV or a display screen), a screen mirroring mode is used for display by default. When a user performs an operation on the terminal with the relatively small screen to enter a graphics library application and open a picture, the graphics library application calls a screen projection interface or sends an instruction to notify a module or a thread in an operating system of the terminal with the relatively small screen to perform screen projection protocol switching. The module or the thread is used to control the screen projection protocol switching. For example, the module or the thread may be a screen projection management center. After performing protocol switching, the module or the thread notifies, by using an instruction, the terminal with the relatively large screen to perform screen projection protocol switching. If the two terminals are located in a same local area network, protocol switching is performed directly. If the two terminals are not located in a same local area network, the two terminals need to be connected in a same local area network by using a P2P technology, and a connection that is based on a switched-to protocol needs to be established between the two terminals. Only in this way can a high-definition picture be displayed on the terminal with the relatively large screen by using the switched-to protocol.

In the conventional technology, during screen mirroring, a sink end can control a content resource projected by a source end, for example, switching from a video being played to a next segment or switching a projected picture. In other words, a protocol for screen projection remains unchanged while projected content is changed, for example, a Miracast technology is used. During screen mirroring, the sink end displays only a picture or a video displayed on the source end. Therefore, a display effect of screen projection depends on a processing capability of the source end. The source end usually has a limited video or picture processing capability, while the sink end usually has a better processing capability. In this case, if a high-definition picture or high-definition video (for example, in 1080p, BLU-RAY, or another format) is projected, a playing effect that most matches a format of played content may not be achieved by using a screen mirroring technology. As a result, the played content is not processed (for example, decoded and played) in a more proper manner by using a processing resource. Therefore, in the method described in this application, if a switched-from protocol corresponds to the Miracast technology and a switched-to protocol is based on a DLNA technology, during screen projection, when a user opens a high-definition media file or opens an application related to a media file, the media file that needs to be projected can be first transmitted to a sink end by using a connection that is based on the DLNA technology and is then decoded and played at the sink end. This achieves a high-definition display effect at the sink end, thereby properly utilizing a processing resource of the sink end. A source end performs screen projection protocol switching based on a current browsing status (for example, a running status of a foreground application) of a user, without requiring the user to perform an operation in the process. Further, when the user exits viewing of the high-definition media file, the source end switches back to screen mirroring. This protocol switching process does not require the user to perform configuration or an operation and does not require the user to perform an operation of opening or connecting a related application, either. In addition, screen projection connection switching is performed seamlessly in the foregoing process. Screen projection does not need to be interrupted and then re-initiated, and a piece of projected content can be directly switched to another piece of content, avoiding a black screen. In this way, user experience is improved in a screen projection protocol switching process.

Figure 4:
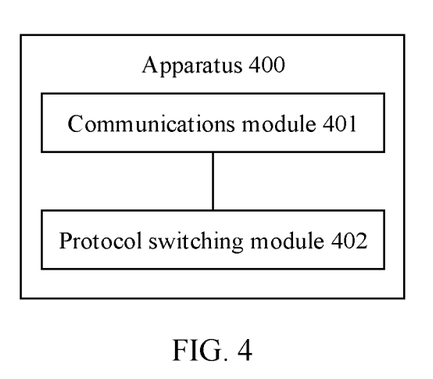
FIG. 4 is a schematic diagram of a communication protocol switching apparatus (corresponding to a first device) according to an embodiment of the present disclosure.

The following describes a communication protocol switching apparatus 400 provided in this application with reference to FIG. 4. The apparatus 400 is located in a first device, and the first device runs a first application. The apparatus 400 includes a communications module 401 configured to communicate with a second device by using a first protocol by the first device, to project a screen of the first device to the second device, and a protocol switching module 402 configured to, when the first application is opened or a media file stored in the first device is opened, switch the first device to a second protocol to communicate with the second device, to project a display user interface of the first application or the media file to the second device, where the first application is used to manage or play a media file.

In an implementation, the protocol switching module 402 is configured to switch, based on an instruction triggered by the first application or a second application that is used to open the media file, the first device to the second protocol to communicate with the second device.

In an implementation, the protocol switching module 402 is configured to, when it is detected that the first application is opened or the media file stored in the first device is opened, switch the first device to the second protocol to communicate with the second device.

In an implementation, the protocol switching module 402 is configured to, when the first application in the first device is opened or the media file stored in the first device is opened, project the display user interface of the first application or the media file to the second device in full screen.

In an implementation, the first device of the protocol switching module 402 maintains a device list corresponding to the second protocol. The device list includes an identifier of a device that can communicate with the first device by using the second protocol. The protocol switching module 402 is configured to, when the first application in the first device is opened or the media file stored in the first device is opened, query the device list corresponding to the second protocol, and if a UDID of the second device is found, switch to the second protocol to communicate with the second device, or if a UDID of the second device is not found, send instruction information to the second device to instruct the second device to perform protocol switching, and receive the UDID of the second device. The UDID of the second device is transmitted by using the second protocol.

In an implementation, the apparatus 400 further includes an identification module configured to identify the second device by using an NFC technology.

In an implementation, the communications module 401 is further configured to, after the identification module identifies the second device, receive the UDID of the second device, where the UDID is transmitted by using the first protocol.

In an implementation, the protocol switching module 402 is further configured to, when the first application in the first device is closed or the media file stored in the first device is closed, switch back to the first protocol for communication with the second device.

The foregoing apparatus can implement the parts performed by the first device in any one of the foregoing methods and various implementations thereof. The foregoing apparatus may alternatively be the first device. Therefore, for other specific implementations of the apparatus, reference may be made to the description of the first device in the foregoing embodiments. Details are not described herein again.

According to another aspect, this application further describes another communication protocol switching apparatus. The apparatus is located in the foregoing second device. In an implementation, the apparatus includes a first communications module and a projection module, where the first communications module is configured to communicate with a first device by using a first protocol, to enable the projection module to project a screen of the first device to the second device, a protocol switching module configured to receive a first instruction that is transmitted by the first device by using the first protocol, and establish a protocol stack of a second protocol based on a P2P technology according to the first instruction, where the first instruction is used to instruct the second device to switch to the second protocol, and a second communications module configured to communicate with the first device by using the second protocol, so that the projection module displays a media file or an application user interface of the first device on the second device.

The foregoing apparatus can implement the parts performed by the second device in any one of the foregoing methods and various implementations thereof. The foregoing apparatus may alternatively be the second device. Therefore, for other specific implementations of the apparatus, reference may be made to the description of the second device in the foregoing embodiments. Details are not described herein again. In addition, this application also records a system. The system includes the first device (source end) in any one of the foregoing implementations and the second device (sink end) in any one of the foregoing implementations. For example, the first device may be a mobile phone or a smart wearing device, and the second device may be a device that has an operating system and display hardware, such as a display screen, a smart television, a smart screen, or a smart large screen.

Figure 5:
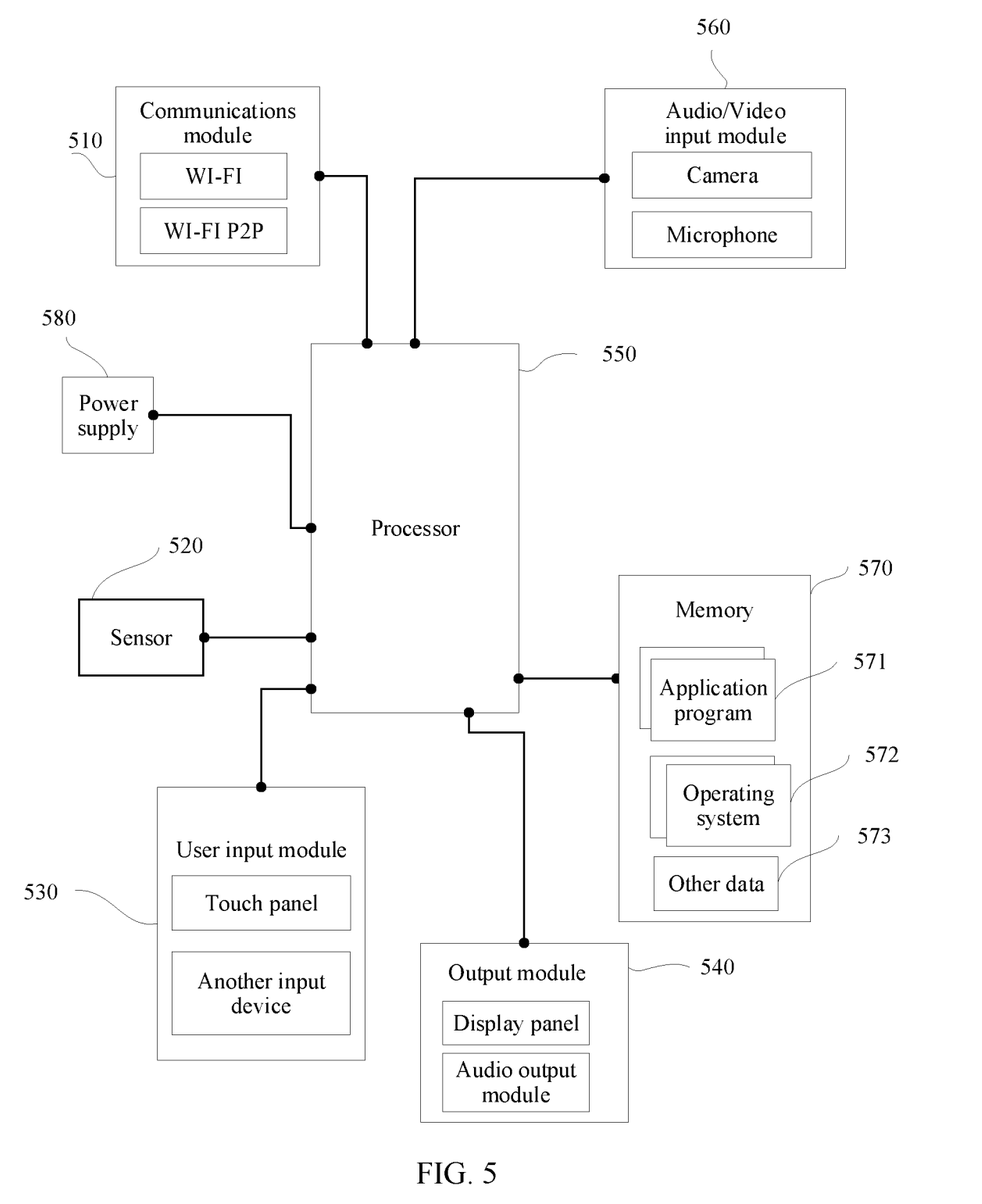
FIG. 5 is a schematic diagram of another communication protocol switching apparatus according to an embodiment of the present disclosure.

FIG. 5 is a schematic structural diagram of a computer system according to this application. The computer system may be understood as an implementation of the foregoing first device or second device. Further, the computer system may be a smartphone, a smart television, a smart large screen, a smart wearing device, or the like. As shown in the figure, the computer system includes a communications module 510, a sensor 520, a user input module 530, an output module 540, a processor 550, an audio/video input module 560, a memory 570, and a power supply 580.

The communications module 510 includes a module that enables communication between the computer system and a communications system or another computer system. For example, the communications module 510 may further include one or more of a wired network interface, a broadcast receiving module, a mobile communications module, a wireless Internet module, a local area communications module, and a location (or positioning) information module. In other words, the first communications module and the second communications module in the foregoing apparatus may be implemented by using the communications module 510. The multiple modules all have multiple implementations in the current technology, and are not described further in this embodiment.

The sensor 520 can sense a current state of the system, for example, an open/closed state, a location, whether the system is in contact with a user, a direction, and acceleration/deceleration. In addition, the sensor 520 may generate a sensing signal used to control an operation of the system.

The user input module 530 is configured to receive input digital information or characteristic information or a contact touch operation/contactless gesture, and receive signal input related to user settings and function control of the system, and the like. The user input module 530 includes a touch panel and/or another input device.

The output module 540 includes a display panel configured to display information entered by a user, information provided for the user, or various menu interfaces of the system. Optionally, the display panel may be configured in a form of a liquid-crystal display (LCD), an organic light-emitting diode (LED) (OLED), or the like. In some other embodiments, the touch panel may cover the display panel, to form a touch display screen. In addition, the output module 540 may further include an audio output model, an alarm, a tactile module, and the like. For example, in this application, screen projection may be implemented on the output module 540.

The audio/video input module 560 is configured to input an audio signal or a video signal. The audio/video input module 560 may include a camera and a microphone. In addition, the computer system may further include an audio/video output module configured to output an audio signal or a video signal.

The power supply 580 may receive external power and internal power under control of the processor 550, and provide power required for operating each component of the computer system.

The processor 550 may indicate one or more processors. For example, the processor 550 may include one or more central processing units, one central processing unit and one graphics processing unit, or one application processor and one coprocessor (for example, a micro control unit or a neural-network processor). When there is a plurality of processors 550, the plurality of processors may be integrated into a same chip, or may be independent chips. One processor may include one or more physical cores, where the physical core is a minimum processing unit.

The memory 570 stores a computer program (or referred to as a computer-readable instruction), and the computer program includes an operating system program 572, an application program 571, and the like. A typical operating system is a system used for a desktop computer or a laptop, such as a WINDOWS system of MICROSOFT and a MACOS system of APPLE, or a system used for a mobile terminal, such as a Linux®-based Android® system, developed by GOGGLE.

The memory 570 may be one or more of the following types: a flash memory, a hard disk type memory, a micro multimedia card type memory, a card type memory (for example, an Secure Digital (SD) or an EXtreme Digital (XD) memory), a random-access memory (RAM), and a static RAM (SRAM), a read-only memory (ROM), an electrically erasable programmable ROM (EEPROM), a programmable ROM (PROM), a magnetic memory, a magnetic disk, or an optical disc. In some other embodiments, the memory 570 may also be a network storage device in the Internet, and the system may perform an operation such as updating or reading in the memory 570 in the Internet.

The processor 550 is configured to read the computer program in the memory 570, and then perform a method defined by the computer program. Various methods for switching a communication protocol provided in this application may be implemented in an application program, or may be implemented in an operating system, or may be jointly implemented by an application program and an operating system. Certainly, the communications module 510 needs to cooperate in steps related to information sending and receiving, and the output module 540 needs to cooperate in steps related to screen projection.

The memory 570 further stores other data 573 in addition to the computer program, for example, a device list that corresponds to a first protocol and that is stored in the first device in this application, and a device list that corresponds to a second protocol and that is stored in the first device in this application.

A connection relationship between the modules in FIG. 5 is merely an example. The method provided in any embodiment of this application may also be applied to a terminal device in another connection manner. For example, all the modules are connected by using a bus. The division into each module is only a logical division, and does not necessarily mean that the modules are separated in terms of hardware. The modules are not necessarily essential to some embodiments of this application.

In addition, a structure in FIG. 5 may be used to implement the apparatuses described above. For example, protocol switching modules in the first device and the second device may be implemented by the processor 550 and the memory 570 in two structures shown in FIG. 5, where the processor 550 reads the computer program in the memory 570.

Another embodiment of this application further records a chip. The chip may be placed in the first device or the second device described above, and is configured to perform the method described in this application.

A person of ordinary skill in the art may understand that all or some of the processes of the methods in the embodiments may be implemented by a computer program instructing relevant hardware (such as a processor). The program may be stored in a computer readable storage medium. When the program runs, the processes of the methods in the embodiments are performed. The foregoing storage medium may include a magnetic disk, an optical disc, a ROM, or a RAM.

In addition, this application further provides a storage medium, a computer program product, a computer program, and the like that are related to the method provided in this application. The storage medium, the computer program product, the computer program, and the like are configured to store a computer-readable instruction. When the computer-readable instruction is executed by one or more processors, any device discovery method provided in this application is implemented. For specific implementation, reference may be made to the foregoing embodiments.

It should be noted that division into modules or units provided in the foregoing embodiments is merely an example, and functions of the described modules are merely used as examples for descriptions. This application is not limited thereto. A person of ordinary skill in the art may combine functions of two or more modules thereof as required, or divide a function of one module to obtain more modules at a finer granularity, and other variants.

For same or similar parts in the foregoing embodiments, mutual reference may be made. "A plurality of" in this application means two or more or "at least two" unless otherwise specified. "A/B" in this application includes three cases: "A", "B", and "A and B". In this application, "first", "second", "third", or the like is merely intended to distinguish between descriptions, and does not limit a sequence. In addition, because a sequence is not limited, when there is no first, there may also be a second or a third.

The described apparatus embodiment is merely an example. The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be further implemented as one or more communications buses or signal cables. A person of ordinary skill in the art may understand and implement the embodiments of the present disclosure without creative efforts.

The foregoing descriptions are merely some specific embodiments of the present disclosure, but are not intended to limit the protection scope of the present disclosure.

What is claimed is:

1. A method implemented by a first device, wherein the method comprises:
   communicating, using a first protocol, with a second device to project a screen of the first device to the second device;
   detecting that a first application in the first device is opened or a first media file stored in the first device is opened, wherein the first application manages or plays at least one second media file; and
   switching, in response to detecting that the first application is opened or the first media file is opened, to a second protocol to project a display user interface of the first application or the first media file to the second device.

2. The method of claim 1, further comprising triggering, using the first application or a second application that is used to open the first media file, switching to the second protocol.

3. The method of claim 1, further comprising:
   detecting, using a software development kit (SDK) for screen projection in the first device, that the first application is opened or the first media file is opened; and
   further switching, in response to detecting, using the SDK, that the first application is opened or the first media file is opened, to the second protocol.

4. The method of claim 1, further comprising projecting the display user interface or the first media file to the second device in full screen.

5. The method of claim 1, further comprising:
- maintaining a device list corresponding to the second protocol, wherein the device list comprises an identifier of a device that can communicate with the first device using the second protocol;
- querying, in response to detecting the first application is opened or the first media file is opened, the device list;
- further switching to the second protocol when a unique device identifier (UDID) of the second device is found; and
- when the UDID is not found:
  - sending indication information to the second device to indicate the second device to perform protocol switching; and
  - receiving, from the second device and using the second protocol, the UDID.

6. The method of claim 1, further comprising identifying, using a near-field communication (NFC) technology, the second device.

7. The method of claim 6, further comprising further identifying the second device by identifying an NFC tag of the second device.

8. The method of claim 1, wherein after identifying the second device, the method further comprises receiving, using the first protocol, a unique device identifier (UDID) of the second device.

9. The method of claim 1, further comprising:
- detecting that the first application is closed or the first media file is closed; and
- switching, in response to detecting that the first application is closed or the first media file is closed, back to the first protocol to further communicate with the second device.

10. The method of claim 1, wherein the first protocol is based on a Miracast technology, and wherein the second protocol is based on a Digital Living Network Alliance (DLNA) technology.

11. A first device comprising:
- a screen;
- a memory configured to store instructions; and
- at least one processor in communication with the memory and coupled to the screen, wherein the instructions cause the at least one processor to be configured to:
  - communicate, using a first protocol, with a second device to project the screen to the second device;
  - detect that a first application in the first device is opened or a first media file stored in the first device is opened, wherein the first application manages or plays at least one second media file; and
  - switch, in response to detecting that the first application is opened or the first media file is opened, to a second protocol to project a display user interface of the first application or the first media file to the second device.

12. The first device of claim 11, wherein the instructions further cause the at least one processor to be configured to trigger, using the first application or a second application that is used to open the first media file, switching to the second protocol.

13. The first device of claim 11, wherein the instructions further cause the at least one processor to be configured to:
- detect, using a software development kit (SDK) for screen projection in the first device, that the first application is opened or the first media file is opened; and
- further switch, in response to detecting, using the SDK, that the first application is opened or the first media file is opened, to the second protocol.

14. The first device of claim 11, wherein the instructions further cause the at least one processor to be configured to project the display user interface or the first media file to the second device in full screen.

15. The first device of claim 11, wherein the instructions further cause the at least one processor to be configured to:
- maintain a device list corresponding to the second protocol, wherein the device list comprises an identifier of a device that can communicate with the first device using the second protocol;
- query, in response to detecting the first application is opened or the first media file is opened, the device list;
- further switch to the second protocol when a unique device identifier (UDID) of the second device is found; and
- when the UDID is not found:
  - send indication information to the second device to indicate the second device to perform protocol switching; and
  - receive, from the second device and using the second protocol, the UDID.

16. A computer program product comprising computer-executable instructions that are stored on a non-transitory computer-readable storage medium and that, when executed by a processor, cause a first device to:
- communicate, using a first protocol, with a second device to project a screen of the first device to the second device;
- detect that a first application in the first device is opened or a first media file stored in the first device is opened, wherein the first application manages or plays at least one second media file; and
- switch, in response to detecting that the first application is opened or the first media file is opened, to a second protocol to project a display user interface of the first application or the first media file to the second device.

17. The computer program product of claim 16, wherein the computer-executable instructions further cause the first device to trigger, using the first application or a second application that is used to open the first media file, switching to the second protocol.

18. The computer program product of claim 16, wherein the computer-executable instructions further cause the first device to:
- detect, using a software development kit (SDK) for screen projection in the first device, that the first application is opened or the first media file is opened; and
- further switch, in response to detecting, using the SDK, that the first application is opened or the first media file is opened, to the second protocol.

19. The computer program product of claim 16, wherein the computer-executable instructions further cause the first device to project the display user interface or the first media file to the second device in full screen.

20. The computer program product of claim 16, wherein the computer-executable instructions further cause the first device to:
- maintain a device list corresponding to the second protocol, wherein the device list comprises an identifier of a device that can communicate with the first device using the second protocol;
- query, in response to detecting the first application is opened or the first media file is opened, the device list;

further switch to the second protocol when a unique device identifier (UDID) of the second device is found; and when the UDID is not found:
send indication information to the second device to indicate the second device to perform protocol switching; and
receive, from the second device and using the second protocol, the UDID.

* * * * *